(12) United States Patent
Nelson et al.

(10) Patent No.: US 7,207,365 B2
(45) Date of Patent: Apr. 24, 2007

(54) CENTRAL TIRE INFLATION SYSTEM ROTARY AIR UNION

(76) Inventors: Christopher A. Nelson, 6724 Mustang Trail, Sanger, TX (US) 76266; James P. LeClaire, 400 Brown Cliff Ct., Double Oak, TX (US) 75077

( * ) Notice: Subject to any disclaimer, the term of this patent is extended or adjusted under 35 U.S.C. 154(b) by 20 days.

(21) Appl. No.: 10/794,176

(22) Filed: Mar. 5, 2004

(65) Prior Publication Data

US 2004/0238093 A1 Dec. 2, 2004

Related U.S. Application Data

(60) Provisional application No. 60/452,401, filed on Mar. 6, 2003.

(51) Int. Cl.
*B60C 29/06* (2006.01)

(52) U.S. Cl. ...................... 152/417; 152/415

(58) Field of Classification Search ............... 152/417, 152/416, 415, 428; 137/580; 340/442; 277/167.3; 301/108.1
See application file for complete search history.

(56) References Cited

U.S. PATENT DOCUMENTS

| | | | |
|---|---|---|---|
| 839,626 A | 12/1906 | Nielsen | |
| 1,016,896 A | 2/1912 | Rivers | |
| 1,112,596 A | 10/1914 | Burggraf, Jr. | |
| 1,794,900 A | 3/1931 | Huchinson | |
| 1,816,693 A * | 7/1931 | Pippin | 152/417 |
| 1,904,073 A | 4/1933 | O'Connor et al. | |
| 2,156,841 A | 5/1939 | Davis | |
| 2,715,430 A | 8/1955 | Lindeman | |
| 3,276,503 A | 10/1966 | Kilmarx | |
| 4,387,931 A | 6/1983 | Bland | |
| 4,685,501 A * | 8/1987 | Williams | 152/417 |
| 5,240,039 A * | 8/1993 | Colussi et al. | 137/580 |
| 5,429,167 A | 7/1995 | Jensen | |
| 5,584,949 A | 12/1996 | Ingram | |
| 5,769,979 A | 6/1998 | Naedler | |
| 6,105,645 A | 8/2000 | Ingram | |
| 6,145,559 A | 11/2000 | Ingramm, II | |
| 6,325,124 B1 | 12/2001 | Colussi et al. | |
| 6,425,427 B1 * | 7/2002 | Stech | 152/417 |
| 6,484,774 B1 * | 11/2002 | Naedler | 152/417 |
| 6,585,019 B1 * | 7/2003 | Ingram | 152/417 |
| 6,843,270 B1 * | 1/2005 | Wang | 137/231 |
| 2002/0124926 A1 * | 9/2002 | Colussi et al. | 152/417 |

* cited by examiner

*Primary Examiner*—Russell D. Stormer
(74) *Attorney, Agent, or Firm*—Westman, Champlin & Kelly, P.A.

(57) ABSTRACT

A central tire inflation system for maintaining tire inflation on a vehicle having a torque transfer sleeve connected between an axle plug assembly and a stationary shaft on the rotary union assembly. A flexible conduit extends through the axle plug to the rotary union assembly and is used to provide air pressure to tires connected to the rotary union assembly. The torque transfer sleeve limits rotational torque on the flexible conduit. Primary and secondary seals are provided on the rotary union assembly as well. A vent chamber between the primary and secondary seals allows the release of air which exits the primary seal, which prevents pressure from entering the lubrication area of the rotary union assembly.

21 Claims, 5 Drawing Sheets

CENTRAL TIRE INFLATION SYSTEM ROTARY AIR UNION

CROSS-REFERENCE TO RELATED APPLICATION(S)

This application claims priority from Provisional Patent Application No. 60/452,401, filed on Mar. 6, 2003, entitled "Central Tire Inflation System Rotary Air Union," invented by Christopher A. Nelson and James P. LeClaire, the contents of which is hereby incorporated by reference.

BACKGROUND OF THE INVENTION

The concept of monitoring, regulating, and maintaining tire pressure on a moving vehicle is not new. Tire pressure maintenance has always been important and the transportation industry has constantly promoted this subject as a means to increase tire life and fuel economy, while reducing down time and maintenance costs due to flat tires. A tire blow out on the road can leave debris that can be hazardous to other drivers. Tire pressure maintenance can decrease the possibility of tire failures and increase safe operation for the vehicle driver and other drivers on the road.

Various systems have been designed and are the subject of numerous patents that accomplish the objective of tire pressure maintenance. These systems are typically called central tire inflation systems (CTIS). The most common systems in the heavy truck industry are designed for trailers. Trailer axles are typically hollow with axle ends that commonly have a through bore. The hollow axle provides an advantageous conduit to supply air pressure to the wheel end. Steer axles and driven axles are more challenging due to typically solid spindles on steer axles and solid rotating shafts inside drive axles.

In all cases (steer, driven, and trailer) the wheel end assembly includes a lubrication area between the axle and the wheel end further defined by plugging the through bore in the axle end and covering the end of the axle with a hub cap attached to the wheel end. The wheel end is supported on the axle end by wheel bearings. The bearings require lubrication and the integrity of the lubrication area is essential in maintaining the operability and life of the wheel end assembly.

In order to provide pressurized air to the rotating tires, the CTIS typically includes a rotary union in the same general location as the bearings and necessarily in the lubrication area between the stationary axle and the rotating wheel end. The most critical function of the CTIS is to not allow pressurized air into the lubrication area. The lubricating oil can be forced past the wheel end seals by air pressure, leading to bearing failure and consequently catastrophic wheel end failure.

Two methods are commonly used in prior art to supply pressurized air to the end of a trailer axle. The first is to pressurize the axle itself. The second is the use of a smaller conduit, such as an air hose, inserted within the axle. U.S. Pat. No. 3,276,503 to Kilmarx (Kilmarx U.S. Pat. No. 3,276,503) teaches the use of plastic tubes inside a hollow axle to supply air to the axle end. U.S. Pat. No. 839,626 to Nielsen, (Nielsen U.S. Pat. No. 836,626) discloses the use of a conduit in the axle itself to conduct the air to the axle end using a fitting in the axle to supply air to the conduit. In either case the air pressure at the end of the axle is then communicated from the stationary axle to the rotating wheel by the use of a rotary union.

Many configurations of rotary unions have been disclosed. Kilmarx U.S. Pat. No. 3,276,503 discloses a rotary air union as part of the hub cap, rotating with the wheel. U.S. Pat. No. 5,584,949 to Ingram (Ingram U.S. Pat. No. 5,589,949) locates the rotary air union in the axle end. U.S. Pat. No. 6,425,427 to Stech (Stech U.S. Pat. No. 6,425,427) splits the rotary union between the rotating hub cap and the stationary axle end. In Kilmarx U.S. Pat. No. 3,276,503, Ingram U.S. Pat. No. 5,589,949, as well as U.S. Pat. No. 6,105,645 to Ingram et al. (Ingram II U.S. Pat. No. 6,105,645) and U.S. Pat. No. 6,145,559 to Ingram (Ingram III U.S. Pat. No. 6,145,559), the rotary union is self-contained where a stationary shaft is bearing mounted to a rotating housing with a seal element. In Stech U.S. Pat. No. 6,425,427, the rotary union is made up of multiple parts that interface during assembly, and in U.S. Pat. No. 5,769,979 to Naedler, the stationary seal and rotary shaft are separate until assembly. In any case the primary function of the rotary air union is to deliver pressurized air from the stationary source to the rotating tire.

The primary seal within the rotary air union also takes various forms. Nielsen U.S. Pat. No. 839,626 uses a spring loaded face seal arrangement, Kilmarx U.S. Pat. No. 3,276,503 also uses a spring loaded seal element biased against an abutting interface, and in U.S. Pat. Nos. 1,016,896, 1,112,596, 2,156,841, and 2,715,430, an o-ring or packing material seals on the outside diameter of the shaft of the rotary union assembly. In each case the primary seal disclosed is the single seal that exists to maintain fluid tight integrity within the rotary union.

The primary seal is a key element of the rotary union. However, in even the best conditions the primary seal can fail and pressurize the lubrication area. To address this issue a number of patents include a vent to atmosphere. Ingram II U.S. Pat. No. 6,105,645 includes a vent in the rotary housing proximal to the primary seal, Ingram III U.S. Pat. No. 6,145,559 provides a vent in the bulkhead assembly attached to the axle, and Ingram U.S. Pat. No. 5,584,949 includes a vent in the hub cap. In all three cases the vent location is inside the lubrication area allowing air pressure to escape to atmosphere.

U.S. Pat. No. 6,325,124 to Colussi discloses a secondary seal and a vent to atmosphere, outside the lubrication area, between the primary seal and the secondary seal. The secondary seal is not in contact with the stem until air pressure is present. There is a vent hole between the two seals in order to vent air escaping the primary seal. The disclosure of this feature in Colussi U.S. Pat. No. 6,325,124 is to provide a warning device for wheel bearing failure. If the wheel bearings fail, the stem will retract from the primary seal allowing tire inflation system air pressure to escape. Air pressure escaping the primary seal will exit the vent hole between the two seals and warn the operator of a bearing problem. The vent is a direct, open conduit from atmosphere to the space between the seals.

A further objective of the rotary union is to supply air from the stationary axle to the rotating wheel and tire when misalignment between the two is present. Varied approaches to this challenge have been disclosed. Kilmarx U.S. Pat. No. 3,276,503 uses a flexible conduit element between the axle end and the rotary union, Ingram III U.S. Pat. No. 6,145,559 uses a flexible conduit between the axle and rotary union, while Ingram II U.S. Pat. No. 6,105,645 uses a flexible hose. In each case the flexible element and its associated seals and connections are torque carrying elements between or within the stationary and rotating components of the rotary union.

Kilmarx U.S. Pat. No. 3,276,503 drives torque through an o-ring seal, a flexible conduit, and a threaded connection, Ingram III U.S. Pat. No. 6,145,559 drives torque through a flexible conduit and a connector, and Ingram U.S. Pat. No. 5,584,949 drives torque through a flexible hose, an o-ring, and a fitting.

In regard to the prior art, improvements can be made to the rotary union assembly of a central tire inflation system. There is a need in the art for a seal arrangement that provides a positive back-up seal as a barrier to system air entering the lubrication area. There is also a need in the art for a vent to atmosphere be located to relieve CTIS air pressure while not pressurizing the lubrication area and not allowing contaminates to enter the seal area. Finally, there is a need in the art for an element that allows for misalignment between the stationary and rotary components of the rotary air union, while isolating the stationary components from excessive torque.

BRIEF SUMMARY OF THE INVENTION

The present invention provides a means to transmit torque between the stationary elements of the rotary air union without applying torque to fittings, seals, or flexible conduits. In addition, the present invention provides a central tire inflation system rotary air union that includes a positive back up rotary seal, (i.e. a secondary seal) in cooperation with a primary face seal. A vent to atmosphere is provided to allow pressurized air escaping the primary seal to escape the rotary air union assembly without entering or pressurizing the lubrication area. The vent to atmosphere also ensures no contaminates enter from the atmosphere to the space between the seals. Lastly, a vent is provided from the lubrication area of the wheel end to the atmosphere without allowing contaminates to enter the wheel end.

BRIEF DESCRIPTION OF THE DRAWINGS

The present invention will be further explained with reference to the drawing figures referenced below, wherein like structure is referred to by like numerals throughout the several views.

Figure 1:
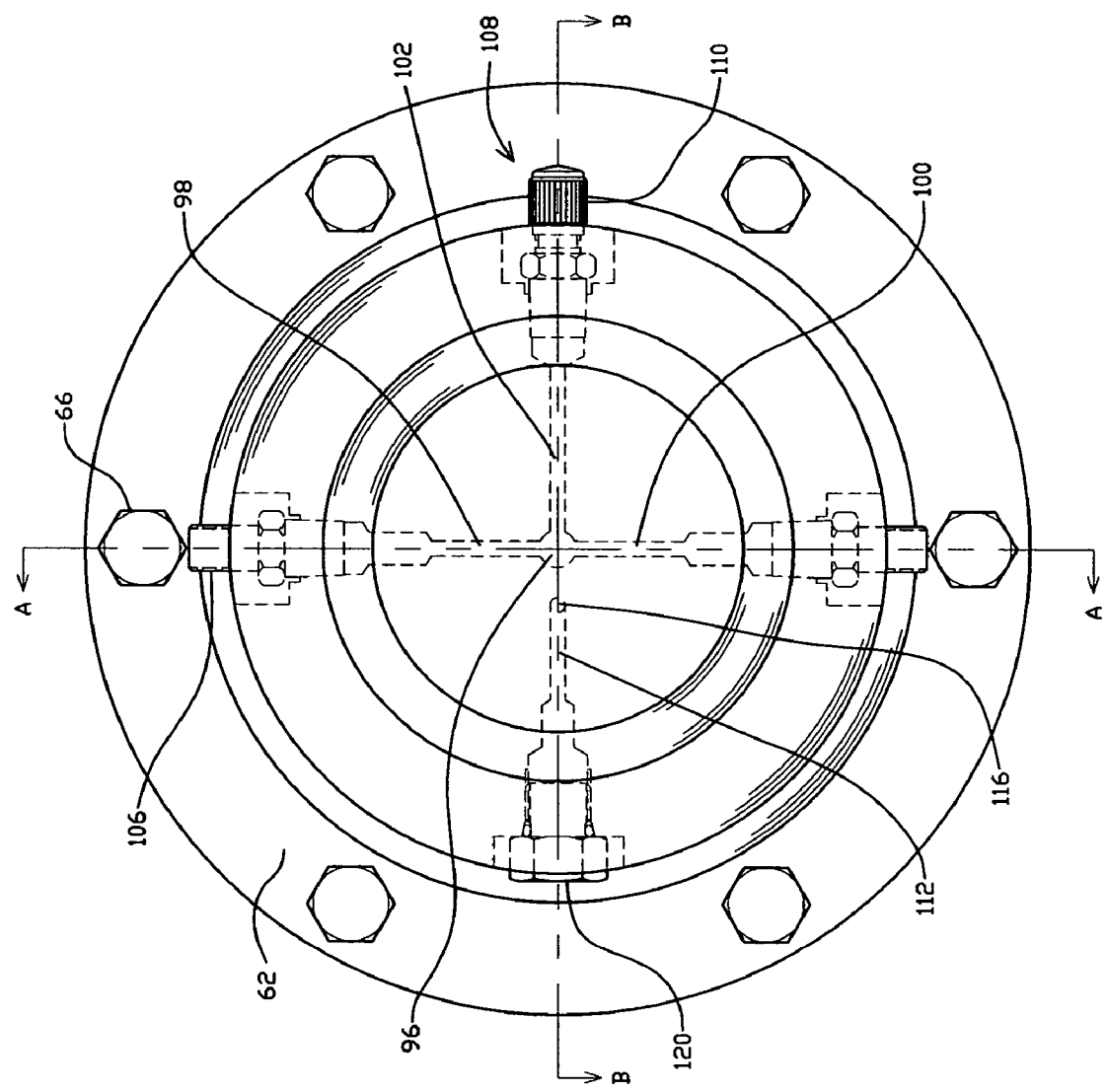
FIG. 1 is a front view of a rotary union assembly.

While the above-identified drawing figures set forth one embodiment, other embodiments of the present invention are also contemplated, as noted in the discussion. This disclosure presents illustrative embodiments of the present invention by way of representation and not limitation. Numerous other modifications and embodiments can be devised by those skilled in the art which fall within the scope and spirit of the principles of this invention. The drawing figures are not drawn to scale.

DETAILED DESCRIPTION

FIG. 1 is a front view of rotary union assembly housing 62 portion of the present invention. Rotary union assembly housing 62 connects to wheel end 64 using fasteners 66. Inside the rotary union assembly housing 62 extend four radial passageways 98, 100, 102, 112. As described more fully with reference to FIGS. 2–3 below, radial passageways 98, 100 supply pressurized air to tires on the rotary union assembly. Radial passageways 98, 100 comprise fittings 106. Fittings 106 are a common tire valve type that opens when a mating fitting is threaded on it and closes when the mating fitting is removed. Radial passageway 102 provides a service port 108 with fitting 110 sealably threaded to the rotary union assembly housing 62. Radial passageway 112 comprises cross drilled bore 116, and fitting 120, and functions as a vent for venting a vent chamber of the rotary union assembly.

Figure 2:
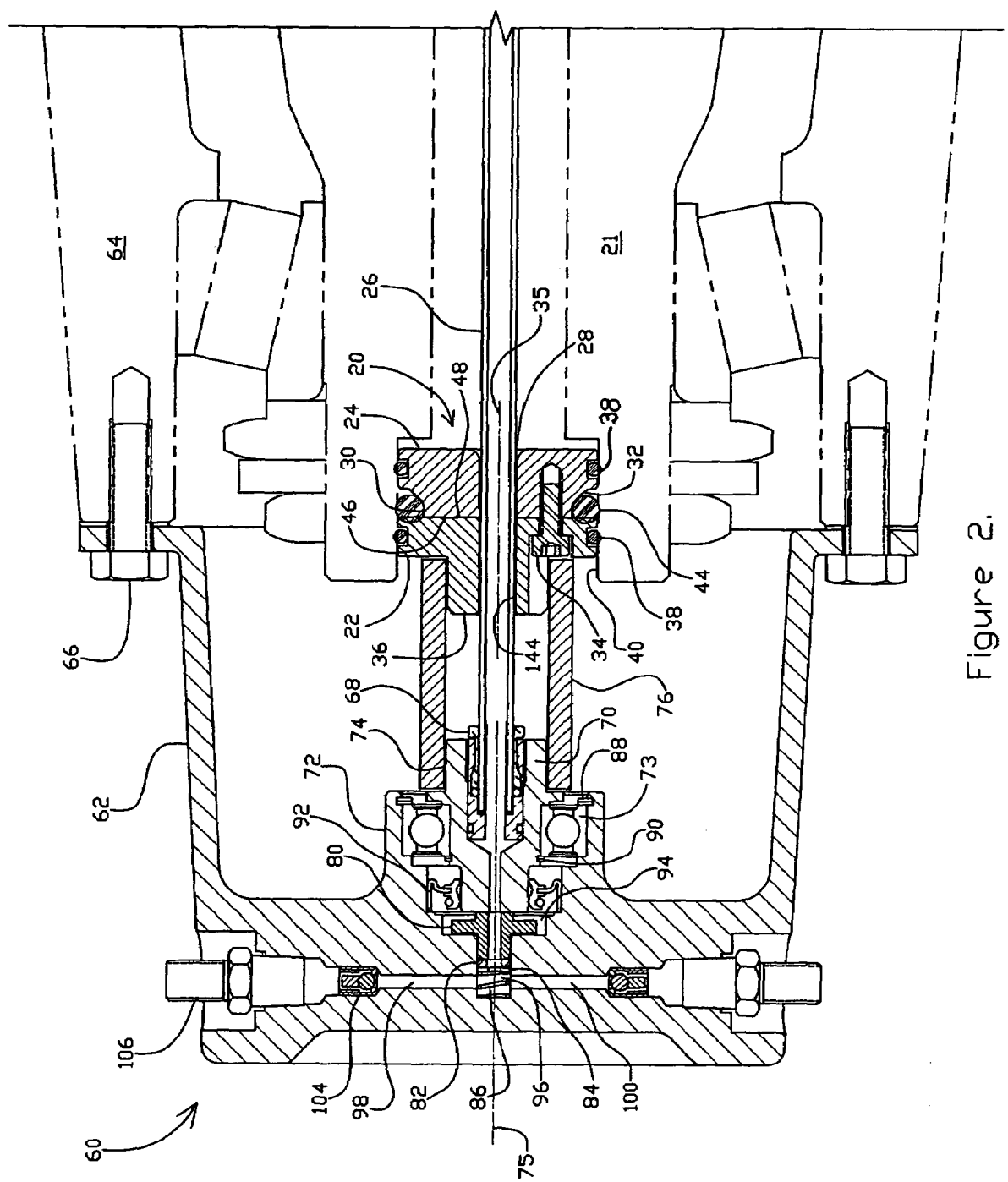
FIG. 2 is a cross-sectional view of a rotary air union assembly showing air passageways to tires.

FIG. 2 is a cross-sectional view of a rotary air union taken along line A—A of FIG. 1. Shown in FIG. 2 is the axle spindle 21, axle plug assembly 20, rotary union assembly 60, and wheel end 64. Axle plug assembly 20 is in the end of the axle spindle 21. Axle plug 22 and axle washer 24 both have axial through bores. The bores are sized to allow flexible conduit 26 to be passed through axle plug 22 and axle washer 24 with a small clearance 28 between the conduit and the bore. Axle plug 22 has hexagonal protrusion 36 extending from its downstream face. Axle washer 24 has a circular pilot 30 smaller than its outside diameter extending from its downstream face and a conical surface 32 extending from the pilot to its outside diameter. Axle washer 24 is threaded to receive plug assembly fasteners 34. Axle plug 22 is drilled and counter bored to allow installation of plug assembly fasteners 34. Small axle end o-rings 38 are installed in the o-ring grooves in the outside diameter of axle plug 22 and axle washer 24. Small o-rings 38 center and seal the axle end washer 24 and axle end plug 22 in bore 40 in the end of axle spindle 21. Large axle o-ring 44 is captured between axle plug 22 and axle washer 24 and statically seals between axle plug 22, axle washer 24, and bore 40 of axle spindle 21.

Plug assembly fasteners 34 are installed though axle end plug 22 and threaded into axle end washer 24. Plug assembly fasteners 34 are tightened until downstream face 46 of axle end washer 24 abuts upstream face 48 of axle end plug. Large axle end o-ring 44 is compressed between upstream face 48 of axle end plug 22, axle spindle bore 40, and conical surface 32 of axle end washer 24. Compressed o-ring 44 seals plug assembly 20 in spindle bore 40 and does not allow plug assembly 20 to rotate relative to bore 40.

Rotary union assembly 60 consists of housing 62 that rotates with and is attached to wheel end 64 by fasteners 66. Flexible conduit 26 exits plug assembly 20 and enters fitting 68. Fitting 68 is sealably press fit into stationary shaft 70. Stationary shaft 70 is bearing mounted to hub 72 of housing 62 with roller bearing 73 and has a matching hexagonal protrusion 74 as axle plug 22 on its upstream end.

Figure 4:
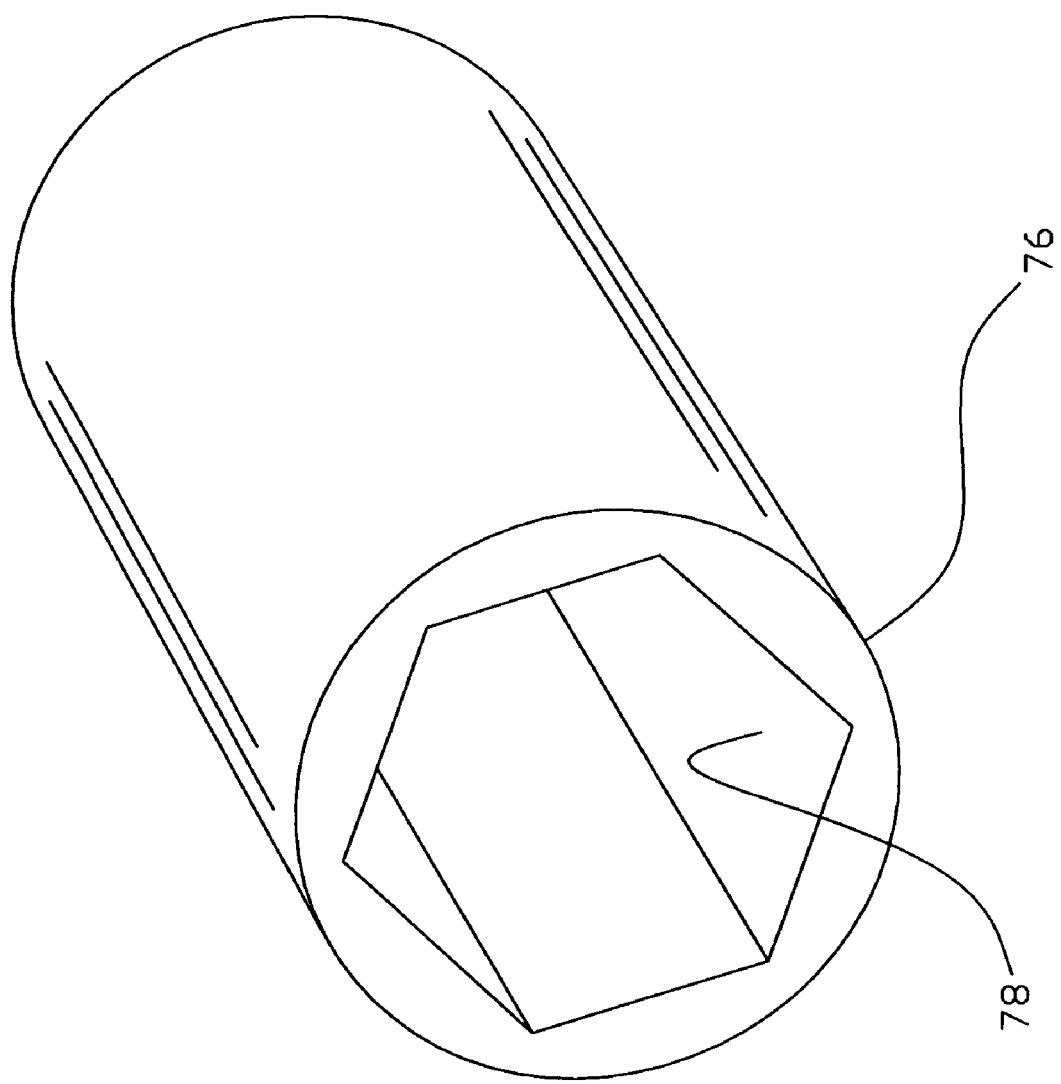
FIG. 4 is a perspective view of a torque transfer sleeve.

Stationary torque transfer sleeve 76 is slidably engaged between axle plug 22 and stationary shaft 70 on hexagonal protrusions 36,74 of stationary shaft 70 and axle plug 22. As shown in FIG. 4, torque transfer sleeve 76 has extrusion 78 through its length. Extrusion 78 is hexagonal, and has a corner-to-corner dimension greater than the corner-to-corner dimensions of hexagonal protrusions 36,74 of axle plug 22 and stationary shaft 70 and less than the outside diameter of torque transfer sleeve 76. The larger torque transfer sleeve hexagonal extrusion 78 allows for misalignment between axle plug hexagonal protrusion 36 and stationary shaft hexagonal protrusion 74.

The relative positions of axle end plug protrusion 36 and the stationary shaft protrusion 74 can be dictated by one or a combination of misalignments. The first possible misalignment is axial. Axial misalignment occurs when the centerline axis 35 of the axle plug protrusion 36 and center-line axis 75 of stationary shaft protrusion 74 are parallel and collinear, but the distance between the ends of the axle plug protrusion 36 and stationary shaft protrusion 74 increase and decrease. The second possible misalignment is an axis offset misalignment. In the case of axis offset misalignment, the axes 35, 75 of the axle plug protrusion 36 and stationary shaft protrusion 74 are parallel but not collinear. The third possible misalignment is the case where the center axes 35, 75 of the protrusions 36, 74 are not parallel and are not collinear.

The torque transfer sleeve 76, acting as a coupling between the protrusions 36, 74, allows for any combination of misalignments between the protrusions. The larger corner to corner dimension of torque transfer sleeve extrusion 78 permits any combination of axis misalignments while still torsionally engaging axle end plug 22 and stationary shaft 70. The length of engagement between each of the protrusions 36, 74 and the extrusion 78 in the torque transfer sleeve 76 permits the torque transfer sleeve 76 to move axially between the axle end plug 20 and the stationary shaft 70 while remaining torsionally engaged.

The shape of the torque transfer sleeve 76 transfers torque between fixed plug assembly 20 and stationary shaft 70, allowing stationary shaft 70 to remain immobile relative to the rotating parts around it while allowing stationary shaft 70 to be misaligned with respect to fixed plug assembly 20. Thus, torque transfer sleeve 76 does not allow fitting 68 or flexible conduit 26 to experience rotational torque that could lead to failure.

Hexagonal shapes of the extrusion 78 on torque transfer sleeve 76 and the corresponding protrusions on axle plug assembly 20 and stationary shaft 70 are shown as exemplary embodiments. Other non-round shapes could be used. Extrusion 78 on torque transfer sleeve 76 and the corresponding protrusions on axle plug assembly 20 and stationary shaft 70 may comprise any suitable shape for achieving rotatable coupling, yet allowing at least some misalignment. For instance, extrusion 78 may comprise any polygonal shape, including but not limited to rectangles, triangles, or hexagons. Extrusion 78 may further comprise a non-polygonal shape, such as a D-shape. For any shape extrusion 78, the corresponding protrusions on axle plug assembly 20 and stationary shaft 70 would have corresponding shapes. It is also contemplated that torque transfer sleeve 76 may comprise a key or notch system, wherein extrusion 78 comprises merely a key and the protrusions on axle plug assembly 20 and stationary shaft 70 have a complementary groove for receiving the key, or vice versa.

Lastly, while extrusion 78 may extend the entire length of the torque transfer sleeve 76, the invention is not so limited. Nor is it required for each end of torque transfer sleeve 76 to have the same shaped extrusion; rather, one end of torque transfer sleeve 76 may comprise an hexagonal extrusion to match a hexagonal protrusion on the axle plug assembly 20, while the extrusion on the other end of the torque transfer sleeve 76 has an alternate shape which matches (for rotatable coupling) a protrusion on the stationary shaft 70.

Torque transfer sleeve 76 may be formed of any suitable material. Due to the environment in which torque transfer sleeve 76 is used, suitable materials will be resistant to abrasion and will have mechanical properties that are retained at high temperature. The torque transfer sleeve 76 is in proximity to the lubrication fluid, which can reach high temperatures during operation of the vehicle. Further, the sleeve 76 is connected to the axle plug assembly 20 and stationary shaft 70 both of which are typically formed of a material such as metal. The sleeve 76 is thus susceptible to wearing. One preferred material that is suitable for the sleeve 76 is a fluoropolymer resin. In particular, a suitable material is Teflon® brand resin, which is manufactured in Parkersburg, W.Va., United States; Shimizu, Japan; and Dordrecht, the Netherlands by E.I. du Pont de Nemours & Co. In addition, any high temperature plastic material is likewise suitable. The lubrication in the wheel end 64 will keep the sleeve 76 lubricated.

Primary seal 80 of rotary union assembly 60 is a face seal that abuts the downstream face of stationary shaft 70. Primary seal 80 is slidably fixed and rotates with housing 62. The downstream end of primary seal 80 is engaged in a bore in the hub 72 of housing 62. Seal 82, washer 84, and spring 86 urge the upstream end of primary seal 80 against the downstream face of stationary shaft 70 and seal the downstream end of primary seal 80 in the bore in hub 72 of housing 62. Seal 82, washer 84, and spring 86 all rotate with housing 62.

Stationary shaft 70 is rotatably fixed to hub 72 of housing 62 by bearing 73. Retaining ring 88 axially fixes bearing 73 relative to hub 72 of housing 62 and retaining ring 90 axially fixes bearing 73 relative to stationary shaft 70. Downstream and adjacent to bearing 73 is secondary seal 92. Secondary seal 92 is a rotary seal, sealably fixed to and rotating with hub 72 of housing 62. Secondary seal 92 positively seals on the outside diameter of the downstream end of stationary shaft 70 under any pressure condition from atmospheric pressure to full tire inflation system pressure. The location of secondary seal 92 and stationary shaft 70 does not change. Stationary shaft 70 is rotatably fixed to housing 62 and secondary seal 92 is sealably fixed to housing 62. A vent chamber 94 is defined between primary seal 80 and secondary seal 92.

Pressure chamber 96 is defined in hub 72 of housing 62 downstream of primary seal 80. Visible in FIG. 2 are two of three (3) radial passageways 98, 100. A third radial passageway 102 is visible in FIG. 3. Three radial passageways 98, 100, 102 are arranged at 90 degrees relative to each other communicate with and extend from the pressure chamber 96 in the hub 72 of housing 62 radially outward to the outside diameter of housing 62. Two (2) radial passageways 98, 100 transfer pressurized air from the pressure chamber 96 to the tires.

Check valve 104 is inserted within each of these two passageways. Check valve 104 allows air pressure to travel from the rotary union to the tires but does not allow airflow from the tires to the rotary union. Check valve 104 is used to keep a first blown tire from affecting the pressure in a second tire supplied by the same rotary union. Check valve 104 has a low cracking pressure of 1 p.s.i.

Fitting 106 is sealably threaded into the housing 62 and in communication with the passageways 98, 100. This type of fitting 106 allows hoses connecting the rotary union to the tire valves to be removed without losing the air pressure within the rotary union. The hoses from fitting 106 to the tires are typical to the industry and are not a subject of this invention.

Figure 3:
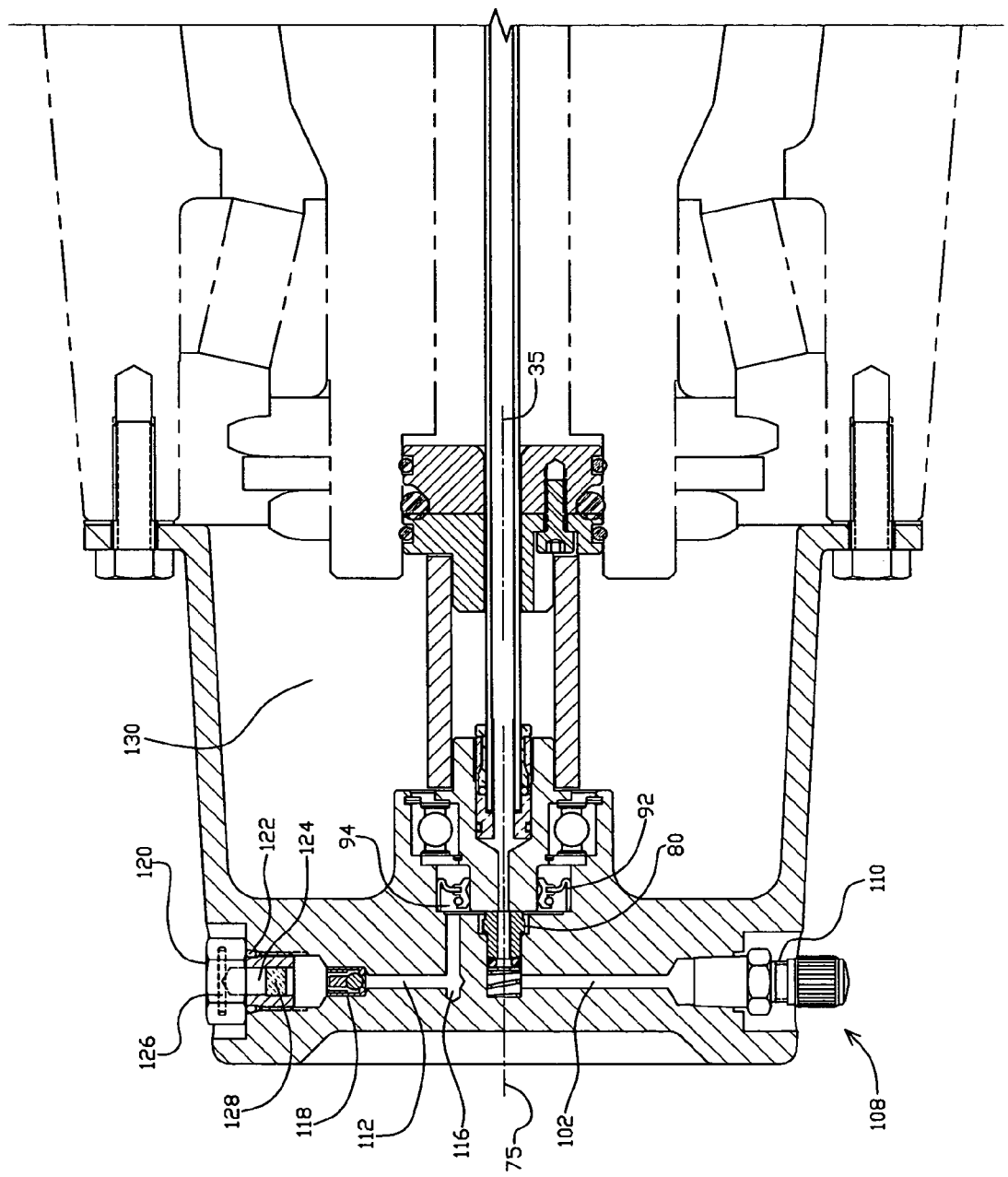
FIG. 3 is a cross-sectional view of the rotary air union assembly showing an air passageway to the vent and the service port.

FIG. 3 is a cross sectional view of the rotary air union assembly taken along line B—B of FIG. 1. As shown in FIG. 3, third radial passageway 102 in communication with the pressure chamber 96 is service port 108. Service port 108 has fitting 110 sealably threaded into the housing 62. This fitting is not connected to a tire by a hose; it is left accessible to allow for checking the pressure in the rotary union system and to provide a central inflation point for manually inflating both tires attached to the rotary union.

Fourth radial passageway 112, arranged at 90 degrees relative to the other three passageways 98, 100, 102, provides a vent for any air pressure escaping primary seal 80. Fourth passageway 112 is in communication with the vent chamber 94. Passageway 112 extends from the outside diameter of housing 62 radially inward to a cross-drilled bore 116. Cross drilled bore 116 is drilled in housing 62 parallel to and radially offset from the centerline of housing 62. Cross drilled bore 116 is radially outside primary seal 80 and radially inside the outside diameter of secondary seal 92, in vent chamber 94. Cross drilled bore 116 is in communication with fourth radial passageway 112 leading to the outside diameter of housing 62 and in communication with vent chamber 94 between primary seal 80 and secondary seal 92.

Check valve 118 is inserted in fourth radial passageway 112. Filter fitting 120 is threaded into the housing and sealed with o-ring 122. Filter fitting 120 has axial counter bore 124 extending from its upstream end radially outward. Cross-drilled bore 126 through the filter fitting is drilled perpendicular to counter bore 124 and is in communication with the counter bore. The cross drilled bore 126 provides a partially protected opening from filter fitting 120 to atmosphere. Filter media 128 is pressed into counter bore 124 in filter fitting 120.

It is common that trailers are subjected to high pressure wash down and are parked in flooded loading docks. Filter fitting 120 and check valve 118 do not allow contaminates to enter the rotary union and affect the function of primary seal 80 and secondary seal 92. Solid contaminates entering the filter fitting are stopped by filter media 128 and liquid contaminates are stopped by check valve 118.

The location of cross drilled bore 116 allows any air pressure escaping primary seal 80 to be contained by secondary seal 92 and vent through cross drilled bore 116, fourth radial passageway 112, check valve 118, and fitting 120 to atmosphere. The vent to atmosphere does not require that secondary seal 92 contain full system pressure. Secondary seal 92 acts as a boundary to any escaping air pressure from primary seal 80 allowing the air pressure to vent to atmosphere and not pressurize lubrication area 130 in the wheel end 64. The low cracking pressure of check valve 118 and the low restriction of filter media 128 allows air pressure escaping from primary seal 80 into vent chamber 94 to reach a maximum pressure considerably lower than system pressure increasing the life and reliability of secondary seal 92.

Figure 5:
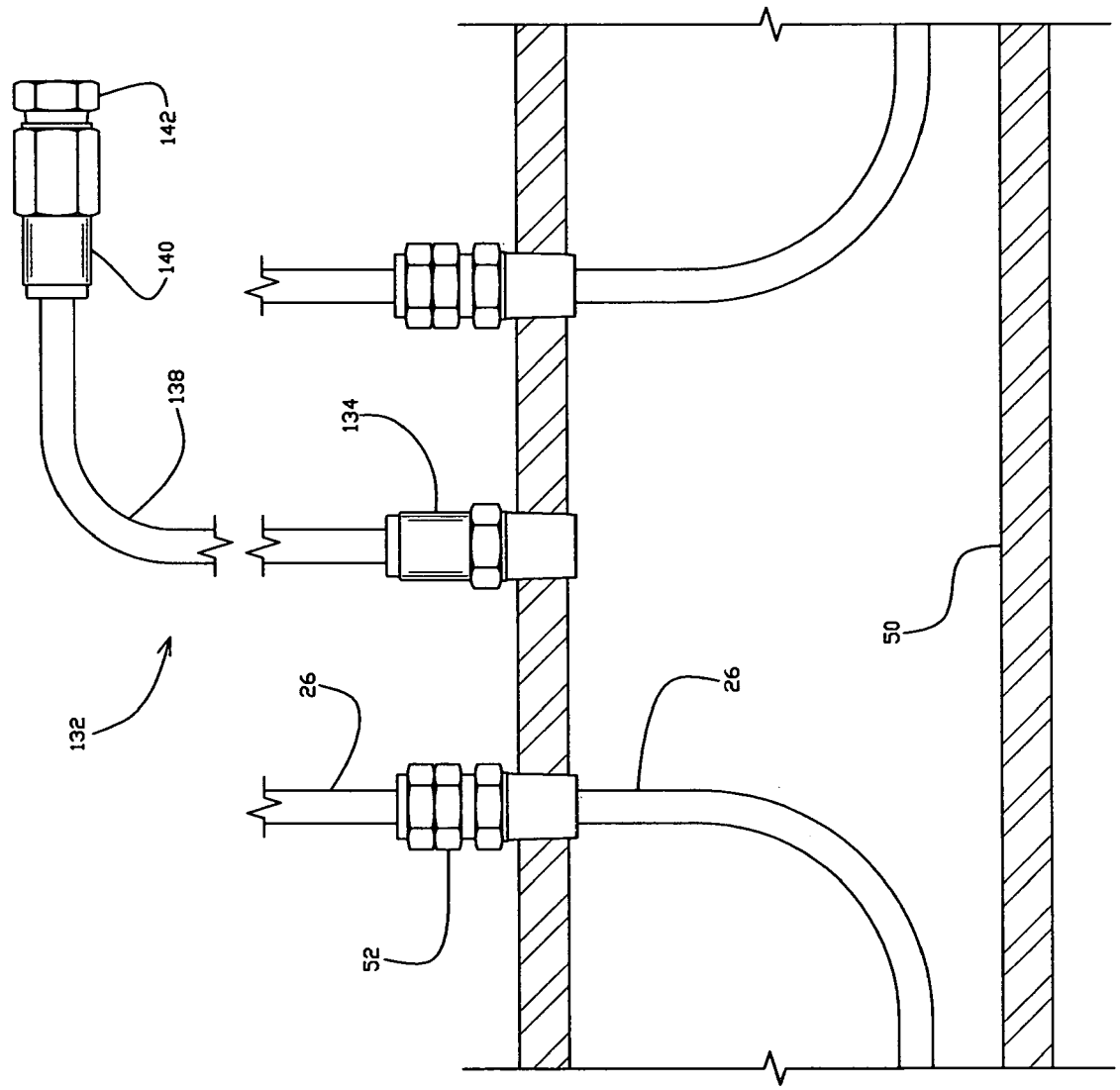
FIG. 5 is a cross-sectional view of a hollow axle showing flexible conduit fittings and axle vent fittings.

Lubrication area 130 exists between housing 62 and axle 50. The lubrication area 130 of the wheel end 64 is typically filled with oil, grease, or a semi-fluid lubricant. These lubricants will expand as they heat up and create a positive pressure within the lubrication area. As shown in FIG. 5, an axle vent assembly 132 is supplied to relieve the pressure.

FIG. 5 is a cross sectional view of a portion of hollow axle 50. Upstream of plug assembly 20, flexible conduit 26 passes through hollow axle 50 and exits axle 50 through bulkhead fitting 52 sealably threaded into axle 50. Bulkhead fitting 52 provides a water tight passage for flexible conduit 26 into axle 50. Flexible conduit 26 is plumbed to a pneumatic control that supplies regulated air pressure to the conduit. The pneumatic control is typical to the industry and is not a subject of this invention. Flexible conduit 26 is plumbed from the pneumatic control through the axle 50 and to rotary union assembly 60 in one continuous length.

Push-in fitting 134 is sealably threaded into hollow axle 50. Flexible conduit 138 is inserted into fitting 134 and routed up toward the under carriage of the vehicle. Push-in fitting 140 with filter 142 is attached to the end of flexible conduit 138 and attached to the under carriage of the vehicle well above the axle. Pressure within the wheel end can escape through the small clearance 28 between conduit 26 and the bore 144 in plug assembly 20 and into hollow axle 50. The pressure can escape the axle through fitting 134, flexible conduit 138, and filter 142 on the end of the conduit. This arrangement allows wheel end lubrication area 130 to vent to atmosphere even if the axle is submerged.

The termination of the vent passage well above the axle along with filter 142 substantially eliminates the possibility of contaminates entering the axle or lubrication area. The small clearance 28 between the conduit 26 and the plug assembly 20 is nearly on the centerline of the axle. Typically the wheel end lubrication area is filled about 50% full. The centerline vent is the most advantageous location, for venting pressure from the lubrication area as the lubricant is generally forced toward the inside diameter of the lubrication area away from the centerline. The torque transfer sleeve 76 protects the area around the clearance 28 between the flexible conduit 26 and the bore 144 from direct contact with the lubricant.

Although the present invention has been described with reference to preferred embodiments, workers skilled in the art will recognize that changes may be made in form and detail without departing from the spirit and scope of the invention.

The invention claimed is:

1. A central tire inflation system for maintaining tire inflation on a vehicle, the central tire inflation system comprising:
    an axle plug assembly connected to an axle of the vehicle;
    a rotary union assembly on a wheel end of the vehicle, the rotary union assembly comprising a stationary portion and a rotatable portion, and comprising a pressure chamber for supplying air pressure to a tire on the wheel end;
    a flexible conduit extending through the axle plug to the rotary union assembly for providing air pressure to the pressure chamber; and
    a coupling, separate from the flexible conduit, between the axle plug assembly and the stationary portion of the rotary union assembly for limiting the application of rotational torque on the flexible conduit.

2. The central tire inflation system of claim 1 wherein the rotary union further comprises:
    a stationary shaft connecting the flexible conduit to the rotary union assembly;
    a primary seal adjacent the stationary shaft sealing the pressure chamber, wherein the pressure chamber is comprised by the primary seal and a housing of the rotary union assembly; and
    a secondary seal sealing a vent chamber, wherein the vent chamber is comprised by the primary seal, stationary shaft, secondary seal, and the housing of the rotary union assembly.

3. The central tire inflation system of claim 2 wherein the vent chamber further comprises a vent which allows the release of air out of the vent chamber.

4. The central tire inflation system of claim 3 wherein the vent further comprises:
    a bore connecting the vent chamber to a passageway leading to the exterior of the rotary union assembly; and
    a check valve on the passageway.

5. The central tire inflation system of claim 4 and further comprising:
   a filter on the passageway.
6. The central tire inflation system of claim 1 and further comprising:
   two passageways with check valves connecting the pressure chamber of the rotary union assembly to tires on the vehicle.
7. The central tire inflation system of claim 1 wherein the pressure chamber further comprises:
   a service port.
8. The central tire inflation system of claim 1 wherein the coupling is sized to allow for misalignment between the axle plug assembly and the stationary portion of the rotary union assembly.
9. A central tire inflation system for maintaining tire inflation on a vehicle, the central tire inflation system comprising:
   an axle plug assembly connected to an axle of the vehicle, wherein the axle plug assembly has a non-round protrusion;
   a rotary union assembly on a wheel end of the vehicle, the rotary union assembly comprising a stationary portion and a rotatable portion, and comprising a pressure chamber for supplying air pressure to a tire on the wheel end, wherein the stationary portion of the rotary union assembly has a non-round protrusion;
   a flexible conduit extending through the axle plug to the rotary union assembly for providing air pressure to the pressure chamber; and
   a coupling between the axle plug assembly and the stationary portion of the rotary union assembly for limiting the application of rotational torque on the flexible conduit, wherein the coupling comprises a non-round bore shaped to rotatably couple with the non-round protrusion on the stationary portion and the non-round protrusion on the axle plug assembly.
10. A vehicle having a central tire inflation system, the vehicle comprising:
   an axle supporting a wheel end;
   a rotary union assembly located on the wheel end, wherein the wheel end comprises a lubrication area;
   an axle plug assembly located between the rotary union assembly and the axle to prevent lubrication from the lubrication area from entering the axle;
   a pressure chamber located in the rotary union assembly for supplying air pressure to a tire on the wheel end;
   a stationary shaft rotatably mounted to the rotary union assembly;
   a flexible conduit extending from the axle through the axle plug assembly to the stationary shaft and in fluid communication with the pressure chamber of the rotary union assembly; and
   a torque transfer sleeve between the axle plug assembly and the stationary shaft for limiting an application of rotational torque on the flexible conduit, wherein the torque transfer sleeve is not in fluid communication with the pressure chamber of the rotary union assembly.
11. The vehicle of claim 10 wherein the pressure chamber connects to the tire via a passageway comprising a check valve.
12. The vehicle of claim 10 wherein the flexible conduit comprises a continuous tube extending from a control system to the rotary union assembly.
13. The vehicle of claim 10 wherein the rotary union assembly further comprises a service port connected to the pressure chamber via a passageway.

14. The vehicle of claim 10 wherein the rotary union assembly further comprises:
   a primary seal adjacent the stationary shaft sealing the pressure chamber, wherein the pressure chamber is comprised by the primary seal and a housing of the rotary union assembly; and
   a secondary seal sealing a vent chamber, wherein the vent chamber is comprised by the primary seal, stationary shaft, secondary seal, and the housing of the rotary union assembly.
15. The vehicle of claim 14 wherein the rotary union assembly further comprises a vent connected to the vent chamber via a passageway.
16. The vehicle of claim 15 wherein the vent further comprises:
   a check valve located on the passageway; and
   a filter located on the passageway.
17. The vehicle of claim 10 wherein the lubrication area comprises an axle vent assembly to allow pressure from the lubrication area to vent through the axle.
18. The vehicle of claim 17 wherein the axle vent assembly further comprises:
   a first fitting on the axle;
   a flexible conduit connected to the first fitting at a first end;
   a second fitting on a second end of the flexible conduit;
   a filter fitting on an end of the second fitting; and
   wherein the flexible conduit is routed to an under carriage of the vehicle so that the second fitting and filter fitting are located above the axle.
19. The vehicle of claim 10 wherein the torque transfer sleeve is shaped to allow misalignment between the axle plug assembly and the stationary shaft.
20. A vehicle having a central tire inflation system, the vehicle comprising:
   an axle supporting a wheel end;
   a rotary union assembly located on the wheel end, wherein the wheel end comprises a lubrication area;
   an axle plug assembly located between the rotary union assembly and the axle to prevent lubrication from the lubrication area from entering the axle, wherein the axle plug assembly has a non-round protrusion;
   a pressure chamber located in the rotary union assembly for supplying air pressure to a tire on the wheel end;
   a stationary shaft rotatably mounted to the rotary union assembly, wherein the stationary shaft has a non-round protrusion;
   a flexible conduit extending from the axle through the axle plug assembly to the stationary shaft and in fluid communication with the pressure chamber of the rotary union assembly; and
   a torque transfer sleeve between the axle plug assembly and the stationary shaft for limiting an application of rotational torque on the flexible conduit, wherein the torque transfer sleeve has a non-round bore sized to rotatably couple with the non-round protrusion of the stationary shaft and the non-round protrusion of the axle plug assembly.
21. A torque transfer sleeve for use on a vehicle having a central tire inflation system having an axle plug assembly connected to a non-rotating axle of the vehicle and a rotary union assembly disposed between the axle plug assembly and a wheel rotatably mounted on an end of the axle, with a flexible conduit extending from the axle plug assembly to the rotary union assembly for supplying air pressure to the central tire inflation system, the torque transfer sleeve comprising:
   a first end adapted to be rotatably coupled to the axle plug assembly; and
   a second end adapted to be rotatably coupled to a stationary shaft of the rotary union assembly to couple the axle plug assembly and stationary shaft together with respect to rotational torque forces, yet allow misalignment between the stationary shaft and axle plug assembly,
wherein the torque transfer sleet is separate from the flexible conduit.

* * * * *

UNITED STATES PATENT AND TRADEMARK OFFICE
CERTIFICATE OF CORRECTION

PATENT NO. : 7,207,365 B2
APPLICATION NO. : 10/794176
DATED : April 24, 2007
INVENTOR(S) : Nelson et al.

Page 1 of 1

It is certified that error appears in the above-identified patent and that said Letters Patent is hereby corrected as shown below:

Claim 21, column 12, line 4, change "wherein the torque transfer sleet is separate from the" to --wherein the torque transfer sleeve is separate from the--.

Signed and Sealed this

Eighteenth Day of September, 2007

JON W. DUDAS
*Director of the United States Patent and Trademark Office*